June 3, 1969
A. N. WRIGHT ET AL
3,447,218
METHOD OF MAKING A CAPACITOR
Filed Dec. 22, 1966
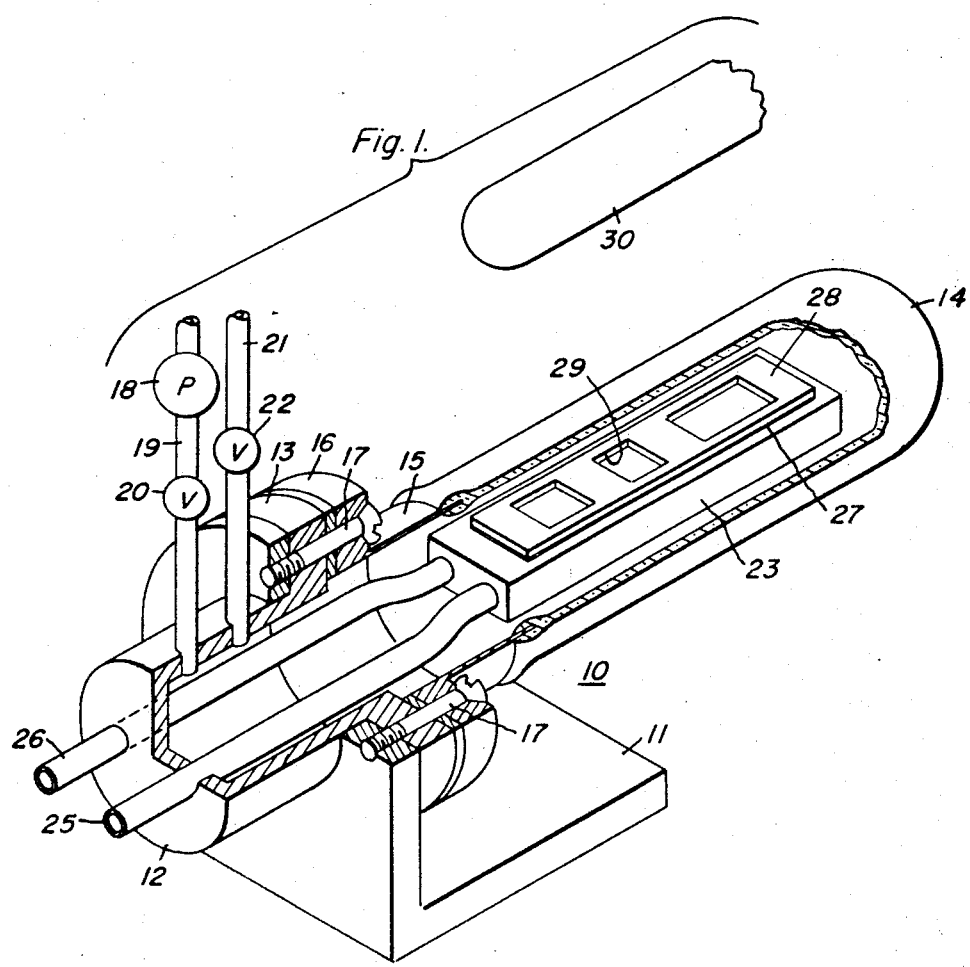
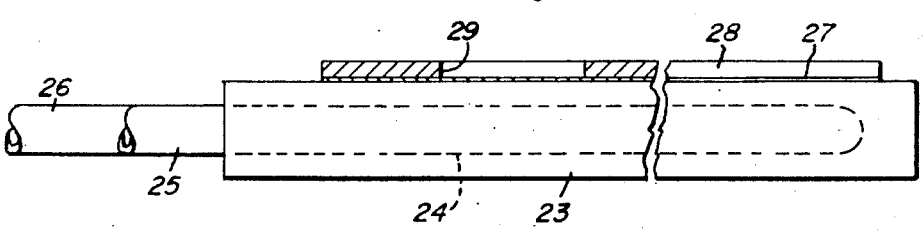
Inventors:
Archibald N. Wright;
Richard C. Merrill,
by Paul R. Webb, II
Their Attorney.

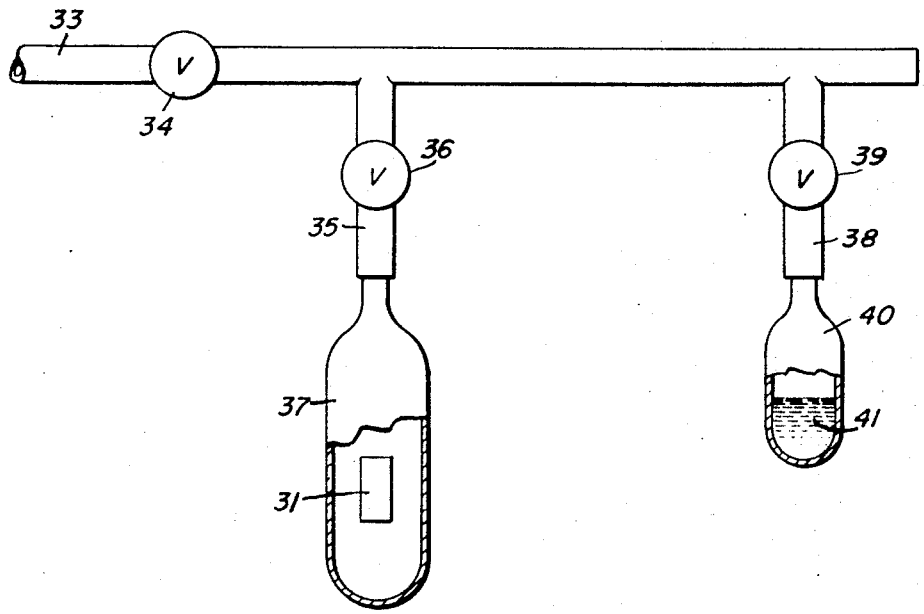
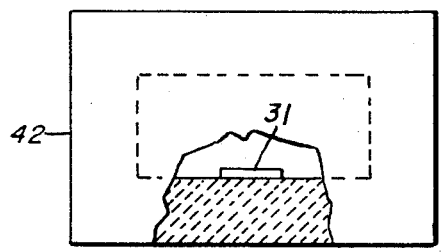
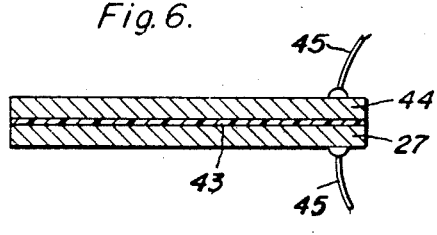

United States Patent Office 3,447,218
Patented June 3, 1969

3,447,218
METHOD OF MAKING A CAPACITOR
Archibald N. Wright, Schenectady, and Richard C. Merrill, Glens Falls, N.Y., assignors to General Electric Company, a corporation of New York
Filed Dec. 22, 1966, Ser. No. 603,960
Int. Cl. H01g 9/04, 13/00
U.S. Cl. 29—25.42                            4 Claims

ABSTRACT OF THE DISCLOSURE

A capacitor has a continuous dielectric film which is formed by ultraviolet surface photopolymerization of perhalogenated material in the gaseous phase. The film is treated with a gaseous medium containing water vapor to effect an irreversible reduction in the dissipation factor.

---

This invention relates to capacitors and to methods of treating the dielectric films thereof and, more particularly, to capacitors with dielectric films formed by ultraviolet surface photopolymerization of a perhalogenated material in the gaseous phase and to methods of treating such dielectric films.

A conventional type of capacitor has a pair of parallel electrically conducting plates or electrodes separated by electrically insulating or dielectric film and an electrical lead connected to each of the electrodes. Such dielectric films must have a low dissipation factor to minimize heating effects and power loss for A.C. applications. In addition, thinness, a high dielectric constant, and a high breakdown strength are desirable. Additionally, when a dielectric film is employed, it must be continuous and imperforate to function as an effective dielectric. It is further required that the film material be stable at the temperature of operation of the particular capacitor. However, when a supported dielectric film is employed, the film must be adhesive. Configurational deposition is also sometimes desirable.

Our invention is directed to improved capacitors and to methods of treating the dielectric films of such capacitors, whereby these capacitors will exhibit the above desirable characteristics. The initial dielectric films, which are treated subsequently to produce improved capacitors, are formed initially by ultraviolet surface photopolymerization of a perhalogenated material in the gaseous phase selected from the group consisting of hexachlorobutadiene, tetrafluoroethylene, trifluoromonochloroethylene, monofluorotrichloroethylene, and hexafluorobutadiene in accordance with the method described and claimed in the copending application of Archibald N. Wright, Ser. No. 530,813 filed March 1, 1966, which application is assigned to the same assignee as the present application.

It is an object of our invention to provide an improved capacitor.

It is another object of our invention to provide an improved method of forming a capacitor which has an adherent, continuous, thin, imperforate dielectric film.

It is a further object of our invention to provide an improved method of treating a dielectric film which is formed by ultraviolet surface photopolymerization of a perhalogenated material in the gaseous phase.

In accordance with our invention, a method of treating a thin dielectric film which is formed by ultraviolet surface photopolymerization of a perhalogenated material in the gaseous phase which comprises maintaining the temperature of the film in a range from 25 to 175° C., and contacting the film with a gaseous medium containing water vapor for a period of time to effect an irreversible reduction in the dissipation factor without a decrease in the dielectric constant.

These and various other objects, features, and advantages of the invention will be better understood from the following description taken in connection with the accompanying drawing.

We have found unexpectedly that a superior capacitor could be formed if its continous dielectric film was formed by ultraviolet surface photopolymerization of a perhalogenated material in the gaseous phase, and was treated at a temperature in the range of 25 to 175° C. by contact with a gaseous medium containing water vapor. We found further that such an improved capacitor exhibited an irreversible lower dissipation factor than a capacitor with a similar dielectric film which had not been treated in accordance with our invention. We found also that while the improved capacitor had a lower dissipation factor, its dielectric constant did not decrease from the value prior to such treatment.

We found that the perhalogenated material should be selected from the class consisting of hexachlorobutadiene, tetrafluoroethylene, trifluoromonochloroethylene, monofluorotrichloroethylene, hexafluorobutadiene, hexafluoropropylene, and mixtures thereof. We found also that the film can be treated over a wide temperature range of 25° to 175° C. As the temperature is increased, the normalized rate of decrease of the dissipation factor per hour increases substantially. Thus, while the film can be subjected in our method to a temperature of 25° C., it is preferred to heat the film to an elevated temperature in view of the rapid increase in the rate at which the dissipation factor decreases. Infra-red studies show that films deposited from the above class of materials are not subject to oxidation in air or in water vapor at temperatures of about 100° C.

We found that the film must be contacted with a gaseous medium containing water vapor to exhibit the unique effect of producing an irreversible reduction in the dissipation factor while maintaining the dielectric constant within one percent. Thus, a gaseous medium consisting essentially of water vapor is a very suitable medium for carrying out the method of our invention. We prefer to employ air as the gaseous medium containing water vapor since the film can be heated directly in a simple and convenient manner to produce our improved film. It will of course be realized that various other gaseous mediums such as oxygen, nitrogen, or helium can be employed, providing they contain water vapor. While the amount of water vapor in the gaseous medium is not critical, it appears to be desirable to have a water vapor with a partial pressure of about 18 millimeters of mercury.

We found that if a film of the above type was heated in a vacuum or heated in oxygen from which water vapor was excluded, there was no reduction in the dissipation factor of the film. However, we found that when water vapor was provided in the oxygen or to a vacuum, the unique irreversible reduction occurred in the dissipation factor of our film.

FIGURE 1 is a perspective view partially in section of an apparatus for forming initially dielectric films on electrodes;

FIGURE 2 is an enlarged side elevational view partially in section of a portion of the apparatus shown in FIGURE 1;

FIGURE 3 is a section view of an electrode with an initial dielectric film thereon formed in accordance with our invention;

FIGURE 4 is a schematic view of apparatus for treating a dielectric film in accordance with our invention;

FIGURE 5 is a schematic view of another apparatus for treating a dielectric film in accordance with our invention; and FIGURE 6 is a sectional view of an improved capacitor embodying our invention.

In FIGURE 1 of the drawing, apparatus is shown generally at 10 for forming initial dielectric films on the surfaces of electrodes for producing improved capacitors in accordance with our invention. A base or support surface (not shown) is provided on which is mounted an L-shaped bracket 11 to support enclosure or chamber 12 having a flange 13 at its open end. A quartz tube 14 is bonded adjacent at its open end by any suitable metal-ceramic seal to a metal cylinder 15 having a flange 16 at its opposite end. Flange 16 is readily threaded to and unthreaded from flange 13 of enclosure 12 by means of a plurality of threaded fasteners 17. A vacuum pump 18 is connected by a line 19 to enclosure 12 to evacuate the latter and associated quartz tube 14. A control valve 20 is provided in evacuation line 19. An inlet line 21 is connected at one end to enclosure 12 and at its other end to a source (not shown) of material to be supplied in gaseous state to tube 14. A control valve 22 is provided in line 21 to control the supply of material to enclosure 12 and tube 14.

A support block 23 of material such as copper, as shown, is positioned within tube 14. Block 23 has a U-shaped metal tube 24 imbedded therein, two ends 25 and 26 of which extend through cylinder 15, flanges 16 and 13, enclosure 12 and through the wall of the latter. Tube 24 circulates a cooling medium such as ethanol to block 23 and positions the block. The ends 25 and 26 of tube 24 are connected to a heat exchanger or to other cooling equipment. A substrate in the form of an aluminum foil electrode 27 is shown positioned on support block 23. A stainless steel light mask 28, which is shown as the same size as aluminum foil 27, has three slots 29 therethrough to provide formation of predetermined patterned thin dielectric films on aluminum foil 27. An ultraviolet light 30, which is normally provided with a reflector (not shown), is shown outside and spaced about quartz tube 14 and supported in any suitable manner. Such a light source provided ultraviolet light in a region of about 2,000 angstroms to 3,500 angstroms, which is directed by the reflector (not shown) towards the upper surface of aluminum foil electrode 27. For example, an Hanovia 700-watt lamp with a reflector will provide this particular light region. A metal enclosure with a door, which is not shown, is positioned around the above apparatus during its operation.

In FIGURE 2 of the drawing, an enlarged side elevation view is shown of support block 23 which was described above in connection with FIGURE 1 of the drawing. Block 23 has a U-shaped tube 24 imbedded therein, the two ends 25 and 26 of which circulate a cooling medium to and from block 23, respectively. Electrode 27 and light mask 28 are shown partially in section to disclose more clearly the apparatus. While three slots 29 are described for light mask 28, a single slot or a larger number of slots may be employed.

In FIGURE 3 of the drawing there is shown in section a composite member 31 comprising an electrode 27 with an initial, continuous dielectric film 32 adhering firmly to its upper surface. Film 32 is formed on the surface of electrode 27 in apparatus 10 shown in FIGURE 1 of the drawing.

In FIGURE 4 of the drawing, there is shown schematically an apparatus for treating a dielectric film in accordance with our invention. A portion of a vacuum line 33, which is shown, is provided with a valve 34, which line is connected to a vacuum pump (not shown). A first connection 35 with an associated valve 36 is shown extending from and communicating with vacuum line 33. The upper open end of a vessel 37 is shown attached to first connection 35. Within vessel 37 there is supported a composite member 31. The means for supporting composite member 31 and associated electrical leads to film 32 on electrode 27 are not shown for simplification of the drawing. Means (not shown) are also provided for vessel 37 to heat composite member 31 therein. A second connection 38 with an associated valve 39 is shown extending from and communicating with vacuum line 33. A smaller vessel 40 is connected at its open upper end to second connection 38. Vessel 40 is provided with a source of water vapor, such as water 41 maintained at a temperature of 0° C. Means (not shown) for monitoring the temperature of water 41 are also provided.

In FIGURE 5 of the drawing there is shown a schematic view of an air oven 42 which may be heated in any conventional manner. Composite member 31 is shown positioned within oven 42 so that film 32 of composite member 31 is contacted by air, a gaseous medium containing water vapor, in a temperature range which is provided by the oven.

In FIGURE 6 of the drawing, there is shown in section a capacitor which has a first electrode 27, a treated, continuous dielectric film 43 adhering firmly to its upper surface, a second electrode 44 in contact with dielectric film 32, and an electrical lead 45 connected to each of the electrodes. Film 43 is formed initially on the upper surface of electrode 27 in the apparatus shown in FIGURE 1 of the drawing and treated subsequently in apparatus such as shown in FIGURE 4 or 5. Such a capacitor can also be made by employing a composite sheet having a first electrode 27, a dielectric film 43 thereon, and a second electrode 44 in contact with film 43. The composite sheet is cut, subsequently, into a plurality of smaller sheets. Each of the smaller sheets has a pair of leads 45 attached to its electrodes thereby forming a plurality of capacitors.

In an illustrative operation of the apparatus shown in FIGURE 1 of the drawing, an electrode 27 was positioned on copper support block 23. A stainless steel light mask 28 with three slots therein was placed on the upper surface of electrode 27. Quartz tube 14 was then attached by its flange 16 to flange 13 of enclosure 12 by means of threaded fastener 17. Vacuum pump 18 was started and pumped down the chamber defined by tube 14, cylinder 15, and enclosure 12 to a pressure of about 1 micron. Valve 20 was then closed. A perhalogenated material selected from the group consisting of hexachlorobutadiene, tetrafluoroethylene, trifluoromonochloroethylene, monofluorotrichloroethylene, hexafluorobutadiene, hexafluoropropylene, and mixtures thereof, was supplied from a liquid source (not shown) through line 21 in a gaseous state to enclosure 12 whereby it was fed into the interior of quartz tube 14. Each of the above materials is initially retained in its liquid state by maintaining its temperature below room temperature which is accomplished by employing a cooling bath surrounding the liquid materials. The liquid is also maintained at a vapor pressure in the range of 0.1 to 8 millimeters of mercury by the temperature of the cooling bath whereby its introduction from the source to the inlet line is in a gaseous state. Ultraviolet lamp 30, having an effective wavelength in the range of 2,000 to 3,500 angstroms, was positioned above quartz tube 14 and spaced approximately two inches from the upper surface of electrode 27.

The monomer was introduced into quartz tube 14 causing a rise in the pressure. A metal hood (not shown) was positioned around apparatus 10 since an ultraviolet light source is used. Lamp 30 was turned on. After a period of time, lamp 30 was shut off, monomer valve 22 was closed, and the system was pumped down to about 1 micron pressure to remove all by-products. The metal hood was removed and the vacuum was then broken. Tube 14 was cooled to room temperature and disconnected by unthreading fasteners 17 which held its associated flange 16 to flange 13. After tube 14 was removed, metal light mask 28 was removed. Examination of electrode 27 showed that three separate and distinct adherent continuous films had been formed on the upper surface of the electrode.

Such a composite member 31 comprising an electrode 27 with a film 32 thereon as described above is shown in FIGURE 3 of the drawing.

A composite member 31 as shown in FIGURE 3 of the drawing is supported in vessel 37 of FIGURE 4 in any suitable manner. Associated electrical leads (not shown) are also attached to film 32 on electrode 27 of member 31. Vessel 37 is attached to first connection 35 which has its associated valve 36 moved to an open position, thereby communicating with vacuum line 33. Valve 39 is closed. Vessel 40, which has been provided with a source of water vapor, such as water 41 maintained at 0° C., is connected at its upper open end to second connection 38. Means (not shown) for measuring the temperature of water 41 are also provided. Valve 34 is opened, thereby evacuating the chamber defined by vessel 37 to a pressure in a pressure range of $10^{-3}$ to $10^{-4}$ millimeters of mercury. After valve 34 is closed, vessel 37 is maintained in a temperature range from 25 to 175° C.

Valve 39 is opened, whereby film 43, which has an initial dissipation factor of from 0.4 to 1.0 percent, is contacted by water vapor from water 41 at a partial pressure of 4.6 millimeters of mercury. The period of contact with the gaseous medium, water vapor, can be varied widely. Generally, the time period is established by an irreversible reduction in the dissipation factor while the dielectric constant of film 43 does not decrease. The final value of the dissipation factor at room temperature and 1 kc. is 0.08 percent. Valve 39 is then closed and a bleed valve (not shown) is opened to restore the chamber defined by vessel 37 to atmospheric conditions. Vessel 37 is then removed from connection 35 after which composite member 31 is removed from the vessel. Dielectric film 43 treated in accordance with our invention results in a film which has an irreversible lower dissipation factor and a dielectric constant within one percent of the value prior to treatment.

In FIGURE 5 of the drawing, a composite member 31 is treated in accordance with our invention by placement in an air oven 42 which may be heated in any conventional manner. The composite member is exposed to a gaseous medium containing water vapor, the surrounding air atmosphere, and is maintained at a temperature in the above temperature range by the furnace. As it will be appreciated, as the temperature is increased, the time period of treating film 43 on electrode 27 is decreased. When an irreversible reduction in dissipation factor is secured while the dielectric constant of the film does not decrease, the power supply to the furnace is turned off. After the furnace is cooled to room temperature, composite member 31 is removed therefrom. Thus, our method provides an improved dielectric film with an irreversible lower dissipation factor.

In FIGURE 6 of the drawing, there is shown an improved capacitor made in accordance with our invention. The capacitor has a first electrode 27, continuous dielectric film 43 treated as above described adhering firmly to the upper surface of electrode 27, a second electrode 44 in contact with dielectric film 43, and an electrical lead 45 connected to each electrode. The second electrode 44 is evaporated onto dielectric film 43 from a metal source.

While it is stated above that a first aluminum foil electrode was employed, many other metallic electrodes in various forms and configurations can be employed. For example, one or both of a pair of electrodes can be of the same or of a different metal including, for example, gold, tin, aluminum, chromium, copper, nickel, and zinc.

Capacitors can also be produced in a similar manner to provide a plurality of adjacent electrodes wherein the above-described improved dielectric film adheres to the surface of one electrode of each pair of adjacent electrodes in the structure. Furthermore, a capacitor roll is provided in the same manner. Additionally, a plurality of these rolls can be positioned in a container to produce a capacitor structure or can be encapsulated. This latter type of capacitor structure, if electrically conductive, is electrically insulated, for example, by a layer of electrical insulation positioned between the exterior surface of the rolls and the interior surface of the container. Such insulation can be provided by forming additionally the above-described dielectric film on the exterior surface of the second electrode of each capacitor roll.

Examples of capacitors, and of methods of treating dielectric films in accordance with our invention are set forth below:

Each of fourteen aluminum substrates had a thin, continuous, dielectric film photopolymerized thereon from hexachlorobutadiene as described above. These composite members are set forth below in Table I as Examples 1–14. In a similar manner, one substrate had such a film photopolymerized thereon from tetrafluoroethylene. This composite member is set forth below in Table I as Example 15. The composite members from Examples 1–15 were each provided with a second electrode which is positioned in contact with the treated dielectric film. A pair of leads are affixed to the respective electrode to complete the capacitor structures.

The films of Examples 1–4 were not treated in accordance with our invention with a gaseous medium containing water vapor. There was no decrease in the dissipation factor.

However, it will be seen in Examples 5–15, which were treated in accordance with our invention showed the desired decrease in dissipation factor. The initial value of the dissipation factors of all of the above films varied from 0.4 to 1.0 percent. In Examples 5–15, the final value of the irreversible dissipation factor after treatment was 0.08 percent at room temperature and 1 kc.

The following table sets forth the example number, the treatment medium, the temperature in degrees centigrade, and the normalized rate of decrease of the dissipation factor per hour (DF/hr.) to the asymptotic values at that temperature. In Examples 5–11 and 15, the treatment medium of air was at 50 percent humidity whereby the water vapor was at a partial pressure of about 12 mm. Hg.

TABLE

| Example No. | Treatment medium | Temperature, °C. | Normalized rate of decrease of DF/hr. |
|---|---|---|---|
| 1 | Pure NO at 34 mm. Hg | 100 | 0 |
| 2 | Pure O$_2$ at 316 mm. Hg | 112 | 0 |
| 3 | Vacuum | 100 | 0 |
| 4 | do | 98 | 0 |
| 5 | Air | 67 | 0.0042 |
| 6 | Air | 82 | 0.018 |
| 7 | Air | 91 | 0.023 |
| 8 | Air | 98 | 0.068 |
| 9 | Air | 118 | 0.26 |
| 10 | Air | 123 | 0.61 |
| 11 | Air | 175 | 11.0 |
| 12 | Water vapor at 4.6 mm. Hg from 0° C. | 98 | <0.5 |
| 13 | Water vapor at 4.6 mm. Hg from liquid water at 0° C. | 100 | 0.033 |
| 14 | Water vapor at 21 mm. Hg from liquid water at 23° C. | 75 | 0.03 |
| 15 | Air | 95 | 0.045 |

Films photopolymerized from hexachlorobutadiene and treated as described above were subjected to a long term stability test which comprised exposure in air at 150° C. for 22 days. A similar exposure was done at 175° C. for twenty-four hours. These films showed maintenance of the decreased dissipation factor and no decrease in the dielectric constant. At temperatures above about 200° C., the dielectric films showed an immediate increase in dissipation factor and dielectric constant on exposure to a gaseous medium containing water vapor.

While other modifications of the invention and variations thereof which may be employed within the scope of the invention have not been described, the invention is intended to include such as may be embraced in the following claims.

What we claim as new and desire to secure by Letters Patent of the United States is:

1. A method of treating a thin dielectric film which comprises providing a film which is formed by ultraviolet surface photopolymerization of a perhalogenated material in the gaseous phase selected from the group consisting of hexachlorobutadiene, tetrafluoroethylene, trifluoromonochloroethylene, monofluorotrichloroethylene, hexafluorobutadiene, hexafluoropropylene, and mixtures thereof, maintaining said film at a temperature in a range from 25° to 175° C., and contacting said film with a gaseous medium containing water vapor for a period of time to effect an irreversible reduction in the dissipation factor without a decrease in the dielectric constant.

2. A method as in claim 1, in which the gaseous medium is essentially water vapor.

3. A method as in claim 1, in which the gaseous medium is air.

4. A method of making an improved capacitor which comprises: (1) forming a dielectric film on the surface of an electrode by ultraviolet surface photopolymerization of a perhalogenated material in the gaseous phase selected from the group consisting of hexachlorobutadiene, tetrafluoroethylene, trifluoromonochloroethylene, monofluorotrichloroethylene, hexafluorobutadiene, hexafluoropropylene, and mixtures thereof, (2) contacting the film while at a temperature in the range of from 25° to 175° C., with a gaseous medium containing water vapor for a period of time sufficient to effect an irreversible reduction in the dissipation factor without a decrease in the dielectric constant, (3) applying a second electrode in contact with the treated dielectric film, and (4) attaching electrical leads to each of the electrodes.

References Cited

UNITED STATES PATENTS

| | | |
|---|---|---|
| 2,162,475 | 6/1939 | Brooks. |
| 2,281,768 | 5/1942 | Heerema _____ 204—159.22 |
| 2,930,714 | 3/1960 | Netherwood _____ 317—260 X |
| 2,932,591 | 4/1960 | Goodman. |

OTHER REFERENCES

Birk: Modern Dielectric Materials, Heywood Co., London (1960), p. 114.

LEWIS H. MYERS, *Primary Examiner.*

E. A. GOLDBERG, *Assistant Examiner.*

U.S. Cl. X.R.

117—93.31; 264—340; 317—258